United States Patent [19]

Yoshii

[11] Patent Number: 4,660,673
[45] Date of Patent: Apr. 28, 1987

[54] CONTROL APPARATUS FOR VEHICLE
[75] Inventor: Takashi Yoshii, Sakai, Japan
[73] Assignee: Kubota, Ltd., Osaka, Japan
[21] Appl. No.: 716,788
[22] Filed: Mar. 25, 1985
[30] Foreign Application Priority Data May 16, 1984 [JP] Japan ............................. 59-72484[U]

[51] Int. Cl.⁴ .............................................. B62D 1/16
[52] U.S. Cl. ..................................... 180/334; 74/493; 280/775
[58] Field of Search ............... 180/334, 336; 280/775; 74/493, 510, 525

[56] References Cited

U.S. PATENT DOCUMENTS

| | | | |
|---|---|---|---|
| 1,367,695 | 2/1921 | Gray | 74/493 |
| 3,170,711 | 2/1965 | Dunifon et al. | 280/775 |
| 3,533,302 | 10/1970 | Hansen | 280/775 |
| 3,710,904 | 1/1973 | Boyer et al. | 180/336 |
| 3,954,146 | 5/1976 | Smemo | 180/336 |
| 4,209,074 | 6/1980 | York | 280/775 |

Primary Examiner—John J. Love
Assistant Examiner—Ross Weaver
Attorney, Agent, or Firm—Edwin E. Greigg

[57] ABSTRACT

There is disclosed a control apparatus for a vehicle comprising a tiltable steering wheel. The control apparatus includes a hand lever tiltable in unison with the steering wheel and substantially on the same axis on which the steering wheel tilts. Operability of the hand lever is unaffected by tilted positions of the steering wheel and hand lever.

10 Claims, 7 Drawing Figures

CONTROL APPARATUS FOR VEHICLE

BACKGROUND OF THE INVENTION

This invention relates to a control apparatus for a vehicle such as a tractor or the like.

Certain types of tractor or like working vehicle comprises a hydraulically operable backward and forward travel switching mechanism incorporated in a propelling power transmission system. This switching mechanism is operable through a control lever by working a backward and forward change lever disposed adjacent a steering wheel, to cause the vehicle to move back and forth. Since this type of vehicle is movable back and forth by simple operations of the change lever, it is well suited for work that involves frequent backward and forward movements. One such example of work is an earth moving operation carried out by a tractor carrying a bulldozing blade. Furthermore, this type of vehicle comprises various hand levers arranged adjacent the steering wheel to facilitate its operation. Generally, these hand levers, including the backward and forward change lever, are mounted to be oscillatable on axes parallel to a steering wheel stem for the sake of their operability.

On the other hand, it is necessary for the steering handle to be positionally adjustable toward and away from the driver so that the driver may steer the vehicle with ease regarding of his physique. This positional adjustment is achieved by flexing the wheel stem on an axis perpendicular thereto.

SUMMARY OF THE INVENTION

The object of this invention is to provide a control apparatus for a vehicle which permits various hand levers disposed adjacent the steering wheel to be smoothly operable regardless of the positional adjustment of the steering wheel.

In order to achieve the above object, a control apparatus according to this invention comprises a steering wheel mounted on a steering wheel stem, the steering wheel and steering wheel stem being tiltable about an axis perpendicular to the steering wheel stem, a control shaft disposed adjacent the steering wheel to be rotatable on an axis parallel to the steering wheel stem, a hand lever connected to one end of the control shaft, and control means connected to the arm to be pivotable about an axis substantially coaxial with the axis about which the steering wheel and steering wheel stem are tiltable.

Since the control means in the above construction is pivoted to an axis substantially coaxial with the axis about which the steering wheel stem is tiltable, the control means becomes displaced relative to the steering wheel when the latter is positionally adjusted, whereby the hand lever is smoothly operable at all times. The positional adjustment does not result in a variation in an amount of operation of the hand lever and therefore require no separate adjustment.

Other advantages of this invention will be apparent from the following description.

BRIEF DESCRIPTION OF THE DRAWINGS

The drawings illustrate an embodiment of this invention, in which.

DESCRIPTION OF THE PREFERRED EMBODIMENT

Figure 4:
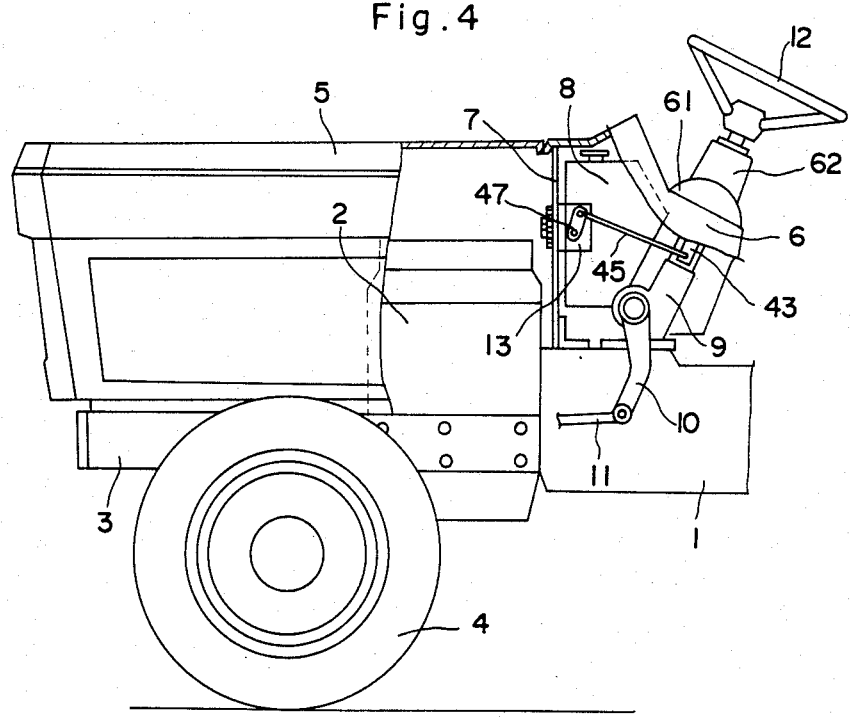
FIG. 4 is a partly broken away schematic side view of a vehicle incoporating the construction of this invention.

Referring to FIG. 4, a tractor portion is shown comprising a frame 1, an engine 2 mounted on the front of the frame 1, a front axle frame 3, and front wheels 4. The tractor further comprises a bonnet 5 enclosing the engine 2, a dashboard 6 disposed rearwardly of the bonnet 5, a cover plate 7 disposed rearwardly of the engine 2, and a fuel tank 8. A steering box 9 is mounted on the tractor frame 1. A pitman arm 10 extends from the steering box 9 to be operatively connected to the front wheels 4 through a drag link 11 and a steering knuckle arm. Number 12 denotes a steering wheel disposed above the steering box 9 to be tiltable as described later. Number 13 denotes a control valve for backward and forward travel switching, which control valve is operable to control a hydraulic operable backward and forward travel switching mechanism 15 incorporated in a propelling power transmission system 14 shown in FIG. 5.

Figure 5:
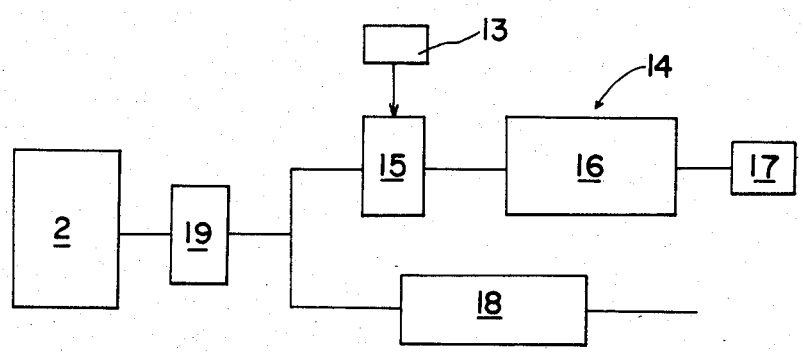
FIG. 5 is a block diagram of a power transmission system.

Referring to FIG. 5, the propelling power transmission system 14 comprises a traveling speed change mechanism 16 and a differential mechanism 17 for driving rear wheels. The propelling power transmission system 14 is housed together with a power takeoff speed change mechanism 18 in a transmission case mounted on the tractor frame 1 and is operatively connected to the engine 2 through a clutch 19.

Figure 1:
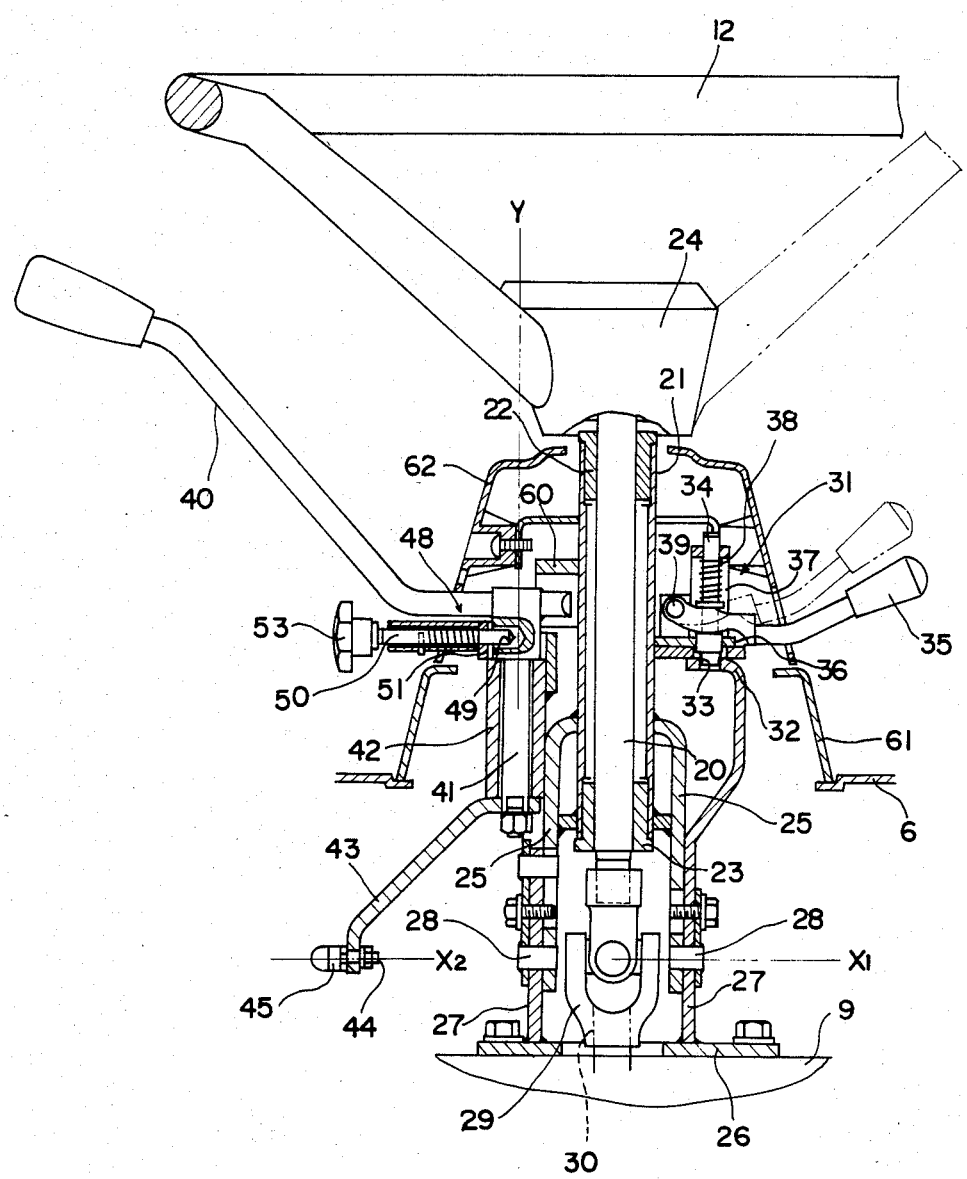
FIG. 1 is a sectional rear view of a principal portion of a construction embodying this invention.
Figure 2:
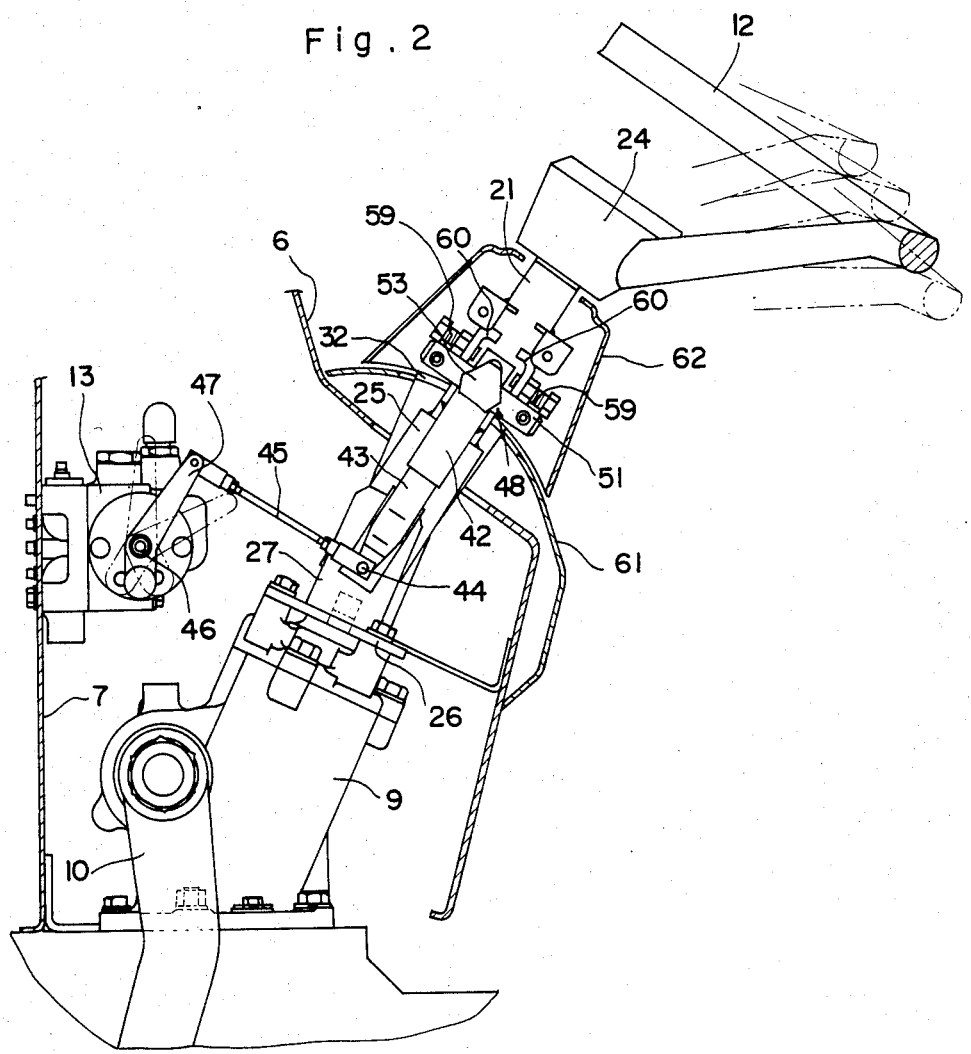
FIG. 2 is a sectional side view of the principal portion.
Figure 3:
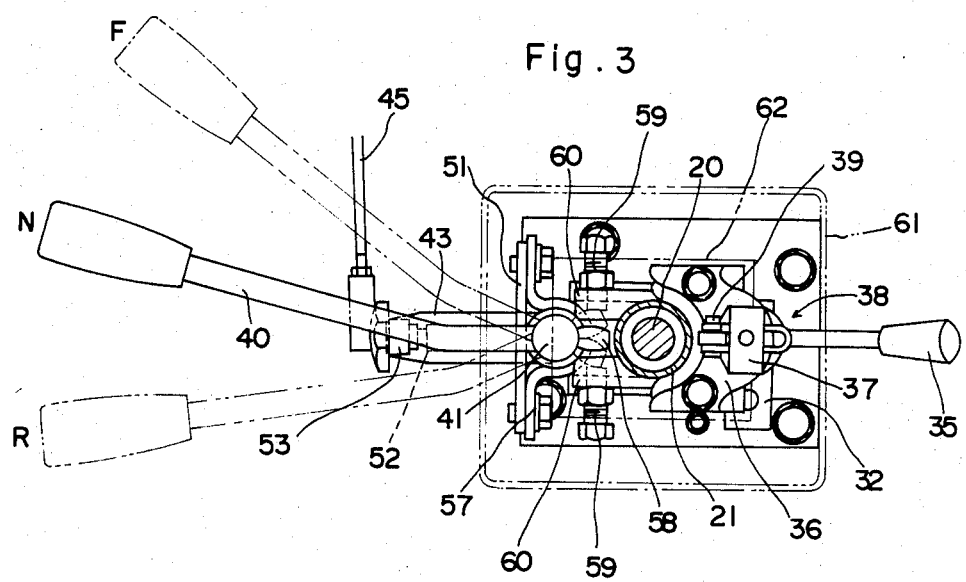
FIG. 3 is a sectional plan view of the principal portion.

The steering wheel 12 is supported as shown in FIGS. 1 through 3. In FIGS. 1 through 3 number 20 denotes a steering wheel stem rotatably supported in a steering column 21 through bearings 22 and 23. The steering wheel 12 is attached to a top end of the stem 20 through a boss portion 24. A pair of brackets 25 is secured to a lower portion of the steering column 21 such that one bracket 25 extends downwardly from one side of the column 21. The brackets 25 lie between a right and left pair of support plates 27 provided on an attaching plate 26 and are pivoted at lower ends thereof to pivot pins 28 having a transverse axis X1, whereby the brackets 25 are pivotable backward and forward relative to the tractor body. The steering wheel stem 20 is connected to a shaft 30 on the steering box 9 through a universal joint 29 disposed on the transverse axis X1. The attaching plate 26 is fixed to the steering box 9.

The steering wheel 12 is tiltable and lockable by a locking mechanism 31 which comprises an engaging plate 32 formed by an upward extension of one of the support plates 27, an engaging pin 34 engageable with apertures 33 defined in the engaging plate 32, and a tilt lever 35 for bringing the engaging pin 34 into and out of engagement with the apertures 33. The engaging plate 32 is in arcuate form about the transverse axis X1 and defines the apertures 33 arranged at suitable intervals in the backward and forward direction. The engaging pin 34 is vertically movably supported by a receiving plate 36 secured to the steering column 12 and a retainer plate 37 of inverted U-shape attached thereto. Further, the engaging pin 34 is urged downwardly by a spring 38 to engage at a lower portion thereof with the apertures 33 in the engaging plate 32. The tilt lever 35 is vertically pivotably attached to the receiving plate 36 by means of a pivot pin 39.

Number 40 denotes a backward and forward switch lever for operating the control valve 13. The switch lever 40 is disposed adjacent the steering wheel 12 and opposite the tilt lever 35 across the steering column 21. The switch lever 40 is secured to a top end of a control shaft 41 parallel to the steering column 21. The control shaft 41 is rotatably supported in a tubular element 42 secured to the bracket 25 of the steering column 21. The control shaft 41 is connected at a lower end thereof with an arm 43 extending outwardly and downwardly. The arm 43 is connected at a lower end thereof with a control rod 45 by means of a pin 44 extending along an axis X2 substantially coaxial with the axis X1 of the pivot pins 28. The control rod 45 is connected to a lever 47 fixed to a rotary shaft 46 of the control valve 13.

Figure 6:
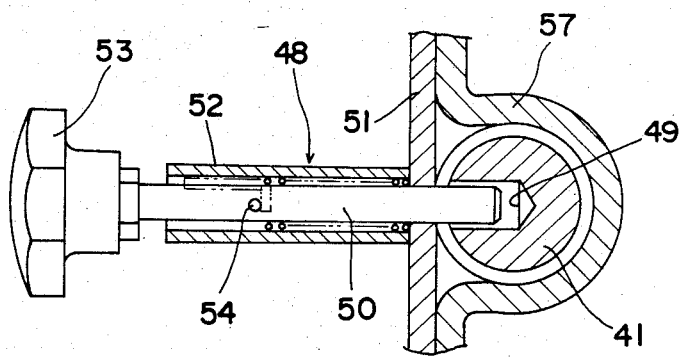
FIG. 6 is a sectional plan view of a locking mechanism.
Figure 7:
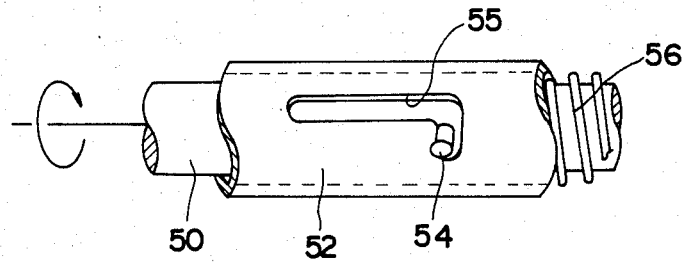
FIG. 7 is a plan view of a principal portion of the locking mechanism.

The switch lever 40 is lockable to neutral N by a locking mechanism 48 comprising an engagement portion 49 defined in an upper portion of the control shaft 41 and a locking element 50 engagable with the engagement portion 49. As shown in FIG. 6, the locking element 50 is inserted into a transversely extending tubular member 52 fixed to a mounting plate 51, and a knob 53 is attached to an outer end of the locking element 50. The locking element 50 carries fixed thereto a pin 54 which, as shown in FIG. 7, is in engagement with an approximately L-shaped guide aperture 55 defined in the tubular member 52. The pin 54 is movable along the guide aperture 55 between two positions, one corresponding to a position of the locking element 50 to engage the engagement portion 49 and the other corresponding to a position of the locking element 50 to release the engagement portion 49. The locking element 50 is urged by a spring 56 toward the release position. The mounting plate 51 is attached to a fixing plate 57 of Ω shape so as to embrace the control shaft 41 therebetween, the fixing plate 57 being secured to a top end of the tubular element 42. Number 58 denotes a projection secured to the control shaft 41 opposite the switch lever 40 to be engagable with a pair of stopper bolts 59 mounted on plates 60 secured to the steering column 21. Number 61 denotes a fixation cover mounted on the dashboard 6. Number 62 denotes a movable cover fixed to the steering column 21.

The foregoing construction permits the steering wheel 12 to be adjusted to the driver as desired. More particularly, the steering wheel 12 and the steering column 21 become tiltable backward or forward about the pivot pins 28 and lockable in position by operating the tilt lever 35 to move the locking pin 34 into and out of engagement with the apertures 33. At this time the switch lever 40 moves in unison with the steering column 21, and therefore no change occurs in the positional relationship between the steering wheel 12 and the switch lever 40 whereby a good operability is maintained. Furthermore, since the connection between the arm 43 and the rod 45 is situated substantially on the axis X1 of the pivot pins 28, there is no possibility of an operational error of the control valve 13 due to the tilting of the steering wheel 12.

The switch lever 40 is locked by moving the locking element 50 into engagement with the engagement portion 49, which is effective to prevent the vehicle from starting inadvertently because the control valve 13 will remain inoperative even if the driver inadvertently touches the switch lever 40 while the engine 2 is running. The unlocking the switch lever 40 the driver has only to turn the knob 53 and locking element 50 a certain degree in the direction indicated by an arrow in FIG. 7, which brings the pin 54 into line with an axial portion of the L-shaped guide aperture 55 permitting the locking element 50 to disengage from the engagement portion 49. After this unlocking operation the switch lever 40 is turned on the axis Y of the control shaft 41 to actuate the control valve 13 which in turn actuates the backward and forward travel switching mechanism 15. It will be appreciated that in FIG. 3 reference F denotes a forward position and reference R denotes a reverse position of the switch lever 40.

More particularly, the switch lever 40 operatively connected to the control valve 13 undergoes a relatively small operational resistance and tends to move easily when touched by mistake. This entails a danger of the vehicle inadvertently starting backward or forward unless the engine is at rest. As described hereinbefore, the construction according to this invention is such that the locking element 40 is operable to lock and unlock the switch lever 40. Therefore, this invention has the further advantage of permitting the switch lever 40 to be locked when desired, which prevents inadvertent starting of the vehicle and significantly promotes safety.

It is in accordance with this invention to arrange that the lever 40 controls one of varied types of mechanism instead of the backward and forward travel switching mechanism 15.

What is claimed is:

1. A control apparatus for a vehicle including a floor, said apparatus comprising;
    a steering box (9) projecting upwardly from said floor,
    support means (26, 27) mounted on the steering box,
    a steering column (21) attached to the support means and tiltable on a first horizontal axis (X1),
    a steering wheel stem (20) extending through the steering column,
    a steering wheel (12) mounted on an upper end of the steering wheel stem,
    a universal joint (29) attached to a lower end of the steering wheel stem and having a point of flexion thereof substantially on the first horizontal axis,
    a control shaft (41) disposed adjacent and parallel with the steering column, said control shaft being rotatable to a plurality of positions including neutral,
    a hand lever (40) connected to an upper end of the control shaft,
    an arm (43) connected to a lower end of the control shaft, and
    link means (45) connected at an end thereof to the arm (43) and pivotable on a second horizontal axis (X2) and connected at the other end thereof to a lever 47 of a vehicle control valve (13), the second horizontal axis being substantially coaxial with the first horizontal axis when the steering wheel shaft is in neutral.

2. A control apparatus as claimed in claim 1 wherein said control means (45) is operatively connected to a control valve (13) for controlling a propelling power transmission system (14).

3. A control apparatus as claimed in claim 2 wherein said propelling power transmission system (14) includes a backward and forward travel switching mechanism (15).

4. A control apparatus as claimed in claim 2 further comprising a locking mechanism (48) mounted on a vehicle frame for locking said hand lever (40) to neutral.

5. A control apparatus as claimed in claim 4 wherein said locking mechanism (48) is engagable with and disengagable from the hand lever (40).

6. A control apparatus as claimed in claim 5 further comprising a tilt locking mechanism (31) for releasably locking said steering wheel (12) against tilting.

7. A control apparatus as claimed in claim 6 wherein said tilt locking mechanism includes an engaging plate 32, an engaging pin which engages said engaging plate, a spring which urges said pin in place and a tilt lever 35 which operates said pin.

8. A control apparatus as claimed in claim 4 wherein said locking mechanism (48) includes a switch lever engaging portion (49), and a locking element 50.

9. A control apparatus as claimed in claim 1 further comprising a pitman arm (10) extending forwardly from the steering box (9), the pitman arm being connected to the universal joint (29) through an interlocking arm (30).

10. A control apparatus as claimed in claim 9 further comprising a convex stationary cover (61) enclosing a region below said hand lever, and a movable cover (62) enclosing a region between the steering wheel and the stationary cover and movable with the steering column over a surface of the stationary cover.

* * * * *